(12) United States Patent
Ogle et al.

(10) Patent No.: US 9,359,547 B2
(45) Date of Patent: Jun. 7, 2016

(54) WELLBORE SERVICING COMPOSITIONS AND METHODS OF MAKING AND USING SAME

(71) Applicant: Halliburton Energy Services, Inc., Houston, TX (US)

(72) Inventors: James William Ogle, Spring, TX (US); Philip D. Nguyen, Houston, TX (US); Feng Liang, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 440 days.

(21) Appl. No.: 13/755,909

(22) Filed: Jan. 31, 2013

(65) Prior Publication Data
US 2014/0213490 A1    Jul. 31, 2014

(51) Int. Cl.
| | |
|---|---|
| C09K 8/68 | (2006.01) |
| C09K 8/80 | (2006.01) |
| C09K 8/035 | (2006.01) |
| C09K 8/12 | (2006.01) |
| C09K 8/22 | (2006.01) |
| C09K 8/40 | (2006.01) |
| C09K 8/508 | (2006.01) |
| C09K 8/88 | (2006.01) |

(52) U.S. Cl.
CPC .............. *C09K 8/805* (2013.01); *C09K 8/035* (2013.01); *C09K 8/12* (2013.01); *C09K 8/22* (2013.01); *C09K 8/40* (2013.01); *C09K 8/508* (2013.01); *C09K 8/68* (2013.01); *C09K 8/88* (2013.01)

(58) Field of Classification Search
None
See application file for complete search history.

(56) References Cited

U.S. PATENT DOCUMENTS

| | | | |
|---|---|---|---|
| 3,300,309 A | 1/1967 | Chu | |
| 3,591,575 A | 7/1971 | Golda | |
| 4,974,677 A * | 12/1990 | Shu | ........................ C09K 8/512 166/270 |
| 6,311,773 B1 | 11/2001 | Todd et al. | |
| 6,403,277 B1 | 6/2002 | Sweet et al. | |

(Continued)

OTHER PUBLICATIONS

Foreign communication from a related counterpart application—International Search Report and Written Opinion, PCT/US2014/012109, Mar. 11, 2014, 10 pages.

(Continued)

*Primary Examiner* — Alicia Bland
(74) *Attorney, Agent, or Firm* — Craig W. Roddy; Baker Botts L.L.P.

(57) ABSTRACT

A method of servicing a wellbore in a subterranean formation comprising placing a wellbore servicing fluid comprising a coupling agent, a hardenable resin and a hardening agent into the wellbore wherein the coupling agent comprises a multihydroxy phenyl, a dihydroxy phenyl, a trihydroxy phenyl, ascorbic acid, a hydroxymethylnaphthol, an oxidation product thereof, a derivative thereof, or combinations thereof. A wellbore servicing fluid comprising a coupling agent, a hardenable resin, a hardening agent and a proppant wherein the coupling agent comprises a multihydroxy phenyl, a dihydroxy phenyl, a trihydroxy phenyl, ascorbic acid, a hydroxymethylphenol, a hydroxymethylnaphthol, an oxidation product thereof, a derivative thereof, or combinations thereof.

17 Claims, 1 Drawing Sheet

(56) References Cited

U.S. PATENT DOCUMENTS

| | | | |
|---|---|---|---|
| 6,668,926 | B2 | 12/2003 | Nguyen et al. |
| 6,887,834 | B2 | 5/2005 | Nguyen et al. |
| 6,962,200 | B2 | 11/2005 | Nguyen et al. |
| 7,104,325 | B2 | 9/2006 | Nguyen et al. |
| 7,114,570 | B2 | 10/2006 | Nguyen et al. |
| 7,306,037 | B2 | 12/2007 | Nguyen et al. |
| 7,407,010 | B2 | 8/2008 | Rickman et al. |
| 7,618,937 | B2 | 11/2009 | Messersmith et al. |
| 8,173,395 | B2 | 5/2012 | Cha et al. |
| 8,261,833 | B2 | 9/2012 | Nguyen et al. |
| 2003/0087338 | A1 | 5/2003 | Messersmith et al. |
| 2005/0089631 | A1 | 4/2005 | Nguyen et al. |
| 2010/0160187 | A1 | 6/2010 | Nguyen et al. |
| 2010/0186956 | A1* | 7/2010 | Morgan ............ C09K 8/506 166/293 |
| 2011/0030950 | A1* | 2/2011 | Weaver ............ C09K 8/68 166/276 |
| 2011/0318394 | A1 | 12/2011 | Lee et al. |
| 2012/0029559 | A1 | 2/2012 | Lee et al. |
| 2014/0027116 | A1* | 1/2014 | Suresh ............ C09K 8/56 166/292 |

OTHER PUBLICATIONS

Arumugam, Selvanathan, et al., "Attach, Remove, or Replace: Reversible Surface Functionalization Using Thiol—Quinone Methide Photoclick Chemistry," Journal of the American Chemical Society, 2012, pp. 8408-8411, vol. 134, American Chemical Society.

Gunawan, Rico C., et al., "Surface Presentation of Bioactive Ligands in a Nonadhesive Background Using DOPTA-Tethered Biotinylated Poly(ethylene glycol)," Langmuir, 2007, pp. 10635-10643, vol. 23, No. 21, American Chemical Society.

Kaneko, Daisaku, et al., "Mussel-Mimetic Strong Adhesive Resin from Bio-Base Polycoumarates," Polymer Journal, 2011, pp. 855-858, vol. 43, The Society of Polymer Science, Japan.

Lee, Haeshin, et al., "Single-Molecule Mechanics of Mussel Adhesion," PNAS, Aug. 29, 2006, pp. 12999-13003, vol. 103, No. 35, The National Academy of Sciences of the USA.

Nishida, Jin, et al., "Gelation and Adhesion Behavior of Mussel Adhesive Protein Mimetic Polymer," Journal of Polymer Science, Part A: Polymer Chemistry, 2013, pp. 1058-1065, vol. 51, Wiley Periodicals, Inc.

Yu, Miaoer, et al., "Role of L-3, 4-Dihydroxyphenylalanine in Mussel Adhesive Proteins," J. Am. Chem. Soc., 1999, pp. 5825-5826, vol. 121, No. 24, American Chemical Society.

Yu, Miaoer, et al., "Synthetic Polypeptide Mimics of Marine Adhesives," Macromolecules, 1998, pp. 4739-4745, vol. 31, No. 15, American Chemical Society.

International Preliminary Report on Patentability issued in related PCT Application No. PCT/US2014/012109, mailed Aug. 13, 2015 (7 pages).

* cited by examiner benzoquinone-type
structure benzoquinone-type
structure

WELLBORE SERVICING COMPOSITIONS AND METHODS OF MAKING AND USING SAME

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

This disclosure relates to methods of servicing a wellbore. More specifically, it relates to methods of treating a wellbore with resin compositions.

Natural resources (e.g., oil or gas) residing in a subterranean formation may be recovered by driving resources from the formation into a wellbore using, for example, a pressure gradient that exists between the formation and the wellbore, the force of gravity, displacement of the resources from the formation using a pump or the force of another fluid injected into the well or an adjacent well. The production of fluid in the formation may be increased by hydraulically fracturing the formation. That is, a viscous fracturing fluid may be pumped down the wellbore at a rate and a pressure sufficient to form fractures that extend into the formation, providing additional pathways through which the oil or gas can flow to the well.

To maintain the fractures open when the fracturing pressures are removed, a propping agent (i.e., a proppant) may be used. Proppant packs are typically introduced into the wellbore and surrounding formation during fracturing and completion operations in order to provide a structural frame for both downhole support and fluid collection. In some instances, the proppants may be coated with resin materials (i.e., resin coated proppants) that facilitate the proppant particle's adherence to each other and to the formation surface. However, while delivering a resin-coated proppant into the wellbore, the proppant particles may stick to the equipment, prior to reaching their desired location. Accordingly, an ongoing need exists for more effective compositions and methods of delivering resins and proppants in subterranean formations.

SUMMARY

Disclosed herein is a method of servicing a wellbore in a subterranean formation comprising placing a wellbore servicing fluid comprising a coupling agent, a hardenable resin and a hardening agent into the wellbore wherein the coupling agent comprises a multihydroxy phenyl, a dihydroxy phenyl, a trihydroxy phenyl, ascorbic acid, a hydroxymethylnaphthol, an oxidation product thereof, a derivative thereof, or combinations thereof.

Also disclosed herein is a wellbore servicing fluid comprising a coupling agent, a hardenable resin, a hardening agent and a proppant wherein the coupling agent comprises a multihydroxy phenyl, a dihydroxy phenyl, a trihydroxy phenyl, ascorbic acid, a hydroxymethylphenol, a hydroxymethylnaphthol, an oxidation product thereof, a derivative thereof, or combinations thereof.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1A:
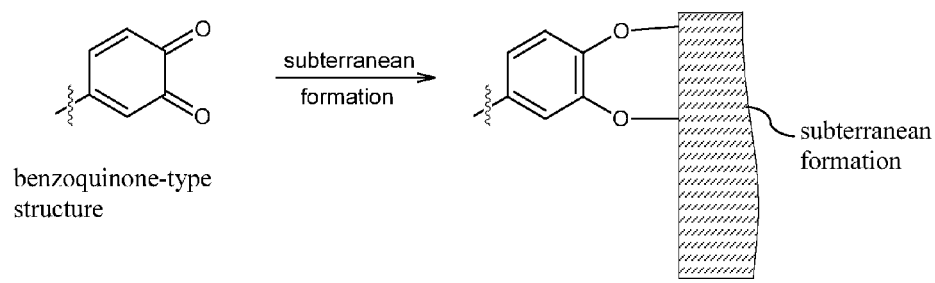
FIGS. 1A and 1B are schematic representations of embodiments of the compositions and methods disclosed herein.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques below, including the exemplary designs and implementations illustrated and described herein, but may be modified within the scope of the appended claims along with their full scope of equivalents.

Disclosed herein are wellbore servicing compositions comprising a coupling agent. In an embodiment, the coupling agent is a multifunctional compound that may be utilized to associate one or more disparate chemical entities such that the entities are indirectly bonded to one another. In some embodiments the coupling agent is a component of a wellbore service and functions to facilitate said service. For example, the coupling agent may be a component of a wellbore composition or wellbore service utilized to enhance the wellbore productivity. In one embodiment, a wellbore servicing fluid suitable for use in the present disclosure comprises the coupling agent, a resin, and a hardening agent, designated herein a coupled resin composition (CRC). Each of these components of the CRC (i.e., the coupling agent, a resin, and a hardening agent) will be described in more detail later herein. In an embodiment, disclosed herein are wellbore servicing fluids (e.g., fracturing fluids) comprising a CRC (i.e., a coupling agent, a resin, a hardening agent) alone or in combination with particulate material (e.g., a proppant such as sand), and may be utilized in any suitable methodology or manner. In an embodiment, the CRC is used in combination with a proppant material to form a resin-coated proppant material that may be used, for example, to fracture a formation to enhance recovery of hydrocarbon.

In an embodiment, the CRC comprises a coupling agent. Without wishing to be limited by theory, a coupling agent may be defined, for the purposes of this disclosure, as a compound capable of reacting with one or more surfaces of the subterranean formation, the resin, the hardener or combinations thereof. For example, the coupling agent may comprise any compound that undergoes a cycloaddition reaction resulting in the coupling agent being covalently bonded to a formation surface. In an embodiment, the coupling agent is a multifunctional compound comprising two or more reactive moieties that can covalently bond to other molecules (e.g., molecules associated with a formation surface). Alternatively, in an embodiment, the coupling agent is a bifunctional compound comprising two reactive moieties that can covalently bond to other molecules.

In an embodiment, the coupling agent comprises multihydroxy phenyls, dihydroxy phenyls, trihydroxy phenyls, ascorbic acid, a compound characterized by Structure I, hydroxymethylnaphthols, oxidations products thereof, derivatives thereof, or combinations thereof:

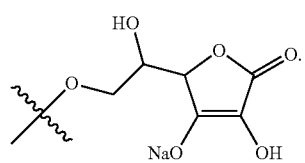

Structure I

The term "derivative" is defined herein to include any compound that is made from one or more of the coupling agents, for example, by replacing one atom in the coupling agent with another atom or group of atoms, rearranging two or more atoms in the coupling agent, ionizing one of the coupling agents, or creating a salt of one of the coupling agents. Herein the disclosure may refer to a coupling agent represented by a structure bordered by one or more wavy lines. It is to be understood that a wavy line in the coupling agent structure designates a free valency which may be filled by a substituent on the coupling agent or through bonding of the coupling agent to another moiety such as the hardening agent and/or the resin. Multihydroxy phenyls, dihydroxy phenyls, and trihydroxy phenyls suitable for use in the present disclosure are described in more detail in U.S. Pat. No. 7,618,937; and U.S. Patent Publication Nos. 2003/0087338 A1, 2011/0318394 A1, 2012/0029559 A1, each of which is incorporated by reference herein in its entirety.

Nonlimiting examples of dihydroxy phenyls suitable for use in the CRC include caffeic acid (i.e., 3,4-dihydroxycinnamic acid) or compounds characterized by any of Structures II through V:

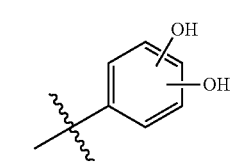

Structure II

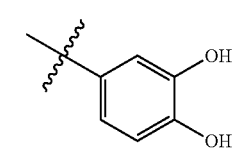

Structure III

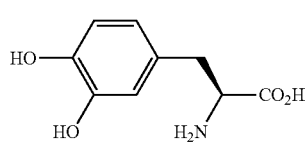

Structure IV

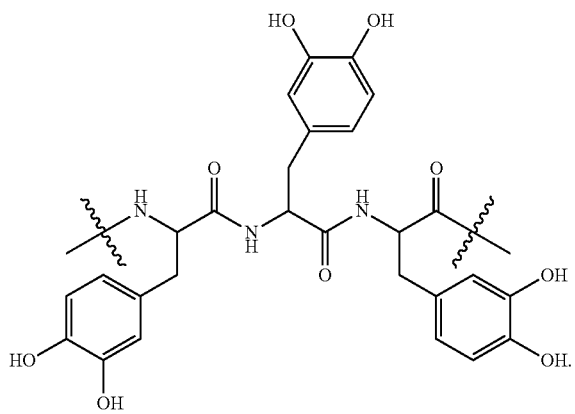

Structure V

Nonlimiting examples of trihydroxy phenyls suitable for use in the CRC include gallic acid, gallates, ethyl gallate, octyl gallate, or compounds characterized by Structure VI or Structure VII:

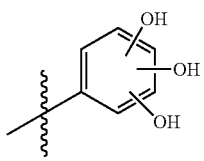

Structure VI

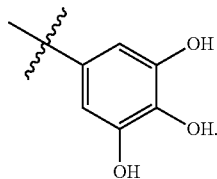

Structure VII

Nonlimiting examples of hydroxymethylnaphthols suitable for use in the present disclosure include compounds characterized by Structure VIII or Structure IX:

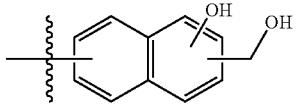

Structure VIII

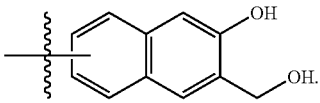

Strucuture IX

In some embodiments, the coupling agent is the product of the oxidation of a polyol. For example, a coupling agent suitable for use in the present disclosure may be formed from a compound comprising at least two hydroxyl groups (—OH) within one molecule which has undergone an oxidation process. As will be understood by one of ordinary skill in the art, the resulting oxidation product may comprise a dione, a benzoquinone, a quinone methide, derivatives thereof, or combinations thereof.

In an embodiment, coupling agent comprises compounds characterized by any of Structures X through XIII:

Structure X

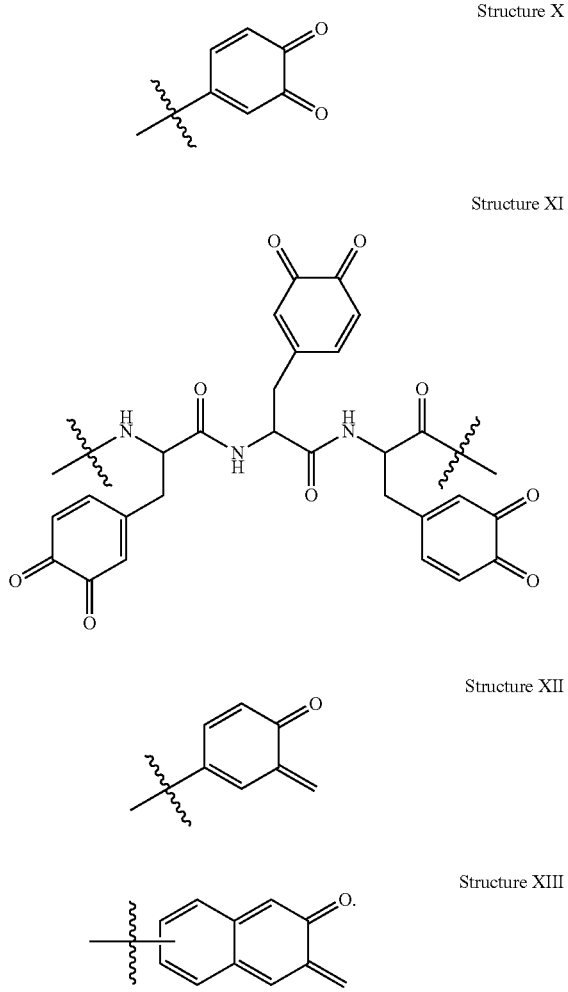

Structure XI

Structure XII

Structure XIII

Figure 1B:
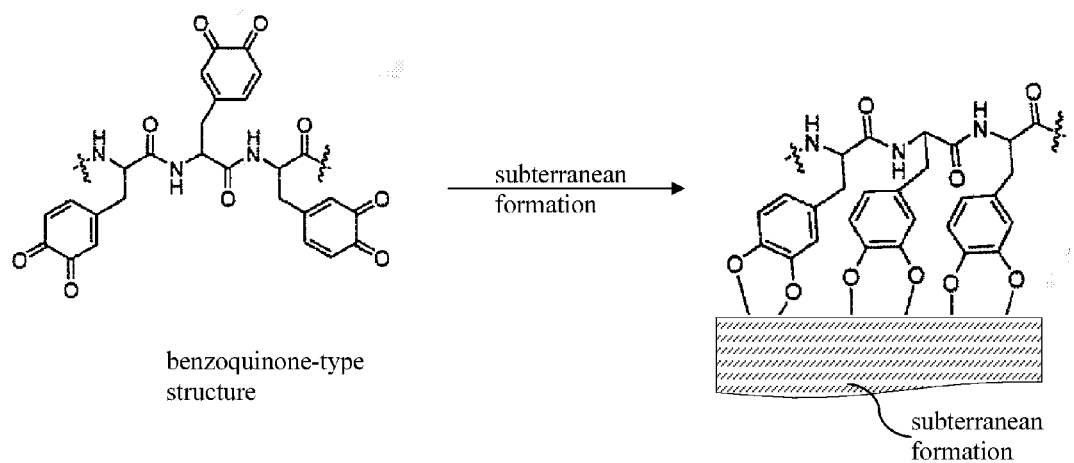

Referring to FIG. 1A, a coupling agent of the type characterized by Structure X may undergo a cycloaddition reaction with one or more surfaces of the formation to covalently bond to the formation surface. In an alternative embodiment and with reference to FIG. 1B, a coupling agent characterized by Structure XI may undergo a cycloaddition reaction with one or more surfaces of the formation to covalently bond to the formation surface. In both FIGS. 1A and 1B, the benzoquinone moieties in the structures react and the product is a molecule covalently bonded to the formation surface. Nonlimiting examples of cycloaddition reactions to the formation surface that may be suitably employed in the methods disclosed herein include Diels-Alder reaction, [4+2] cycloaddition reactions, [3+2] cycloaddition reactions, [2+2] cycloaddition reactions, and the like. Without wishing to be limited by theory, dione-type structures (e.g., the coupling agent characterized by Structures X and XI) may react with a surface of a subterranean formation by undergoing an irreversible cycloaddition (e.g., a [4+2] irreversible cycloaddition reaction) with any number of transition or semimetallic atoms present in all minerals (e.g., Si, Ti, etc.).

In an embodiment, coupling agent comprises ascorbic acid and/or ascorbic acid derivatives (e.g., a product of ascorbic acid oxidation), such as a compound characterized by Structure XIV:

Structure XIV

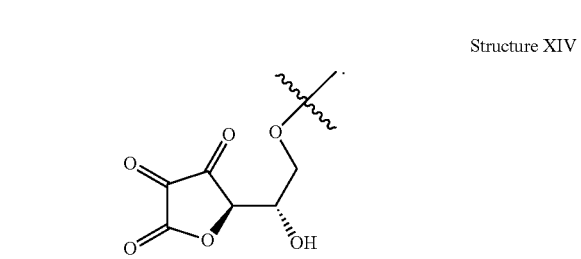 [SMILES: *OC[C@H](O)[C@H]1OC(=O)C(=O)C1=O]

In an embodiment, a coupling agent of the type characterized by Structure XIV may react with the formation surface by undergoing a concerted cycloaddition reaction. In such cycloaddition reaction, the coupling agent reacts with semimetallic and metallic atoms such as silica, magnesium, aluminum. Alternatively, a coupling agent of the type characterized by Structure XIV may react with surfaces comprising free oxides, such as aluminum oxides and silicates, where free electrons on an electronically deficient atom are localized and may participate in a cycloaddition reaction.

Additional descriptions of polyols and their derivatives that may be suitable for use in the present disclosure can be found in J. Am. Chem. Soc. (1999), volume 121, pages 5825-5826; Proc. Nat. Acad. Sci. (2006), volume 103, pages 12999-13003; Langmuir (2007), volume 23, pages 10635-10643; Macromolecules (1998), volume 31, pages 4739-4745; Polymer J. (2011), volume 43, pages 855-858; and J. Am. Chem. Soc. (2012), volume 134, pages 8408-8411; each of which is incorporated by reference herein in its entirety.

In an embodiment, the coupling agent may be included within the CRC in any suitable amount. In an embodiment, a coupling agent of the type disclosed herein may be present within the CRC in an amount of from about 0.01 wt. % to about 10 wt. %, alternatively from about 0.1 wt. % to about 5 wt. %, or alternatively from about 0.5 wt. % to about 2 wt. %, based on the total weight of the CRC.

In an embodiment, the CRC comprises a resin. As used herein, the term "resin" refers to any of a number of physically similar polymerized synthetics or chemically modified natural resins including thermoplastic materials and thermosetting materials. For example, the CRC may comprise a liquid-hardenable resin and a liquid-hardening agent. In an embodiment, the liquid-hardenable resin comprises a hardenable resin and an optional solvent.

In an embodiment, the liquid-hardenable resin comprises a hardenable resin. Nonlimiting examples of hardenable resins suitable for use in this disclosure include organic resins, epoxy-based resins, novolak resins, polyepoxide resins, phenolic/latex resins, bisphenol A diglycidyl ether resin, butoxymethyl butyl glycidyl ether resin, bisphenol A-epichlorohydrin resin, bisphenol F resin, polyepoxide resin, bisphenol epoxy resin, novolak resin, polyester resin, aldehyde resin, phenolic resin, terpolymers of phenol, phenol-aldehyde resin, phenolic formaldehyde resin, urea-aldehyde resin, furan resin, furfuryl alcohol resins, urethane resin, glycidyl ether resin, and the like, or combinations thereof. Resins suitable for use in this disclosure are described in more detail in U.S. Pat. Nos. 7,114,570; 7,306,037; and 7,407,010; each of which is incorporated by reference herein in its entirety.

In an embodiment, the hardenable resin comprises a compound characterized by Structure XV:

Structure XV

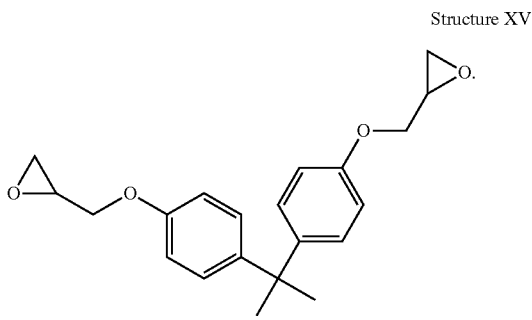 [SMILES: CC(C)(c1ccc(OCC2CO2)cc1)c1ccc(OCC2CO2)cc1]

In an embodiment, the hardenable resin may be included in the liquid-hardenable resin in any suitable amount. In an embodiment a hardenable resin of the type disclosed herein may be present in the liquid-hardenable resin in an amount of from about 5 wt. % to about 95 wt. %, alternatively from about 15 wt. % to about 85 wt. %, or alternatively from about 25 wt. % to about 55 wt. %, based on the weight of the liquid hardenable resin component.

In an embodiment, the liquid-hardenable resin comprises a solvent. The use of a solvent in the liquid-hardenable resin is optional. It is within the ability of one skilled in the art with the benefit of this disclosure to determine if and how much solvent may be needed to achieve a viscosity to meet some user and/or process goal. In an alternative embodiment, the hardenable resin may be heated to reduce its viscosity.

In an embodiment, any solvent that is compatible with the hardenable resin and achieves the desired viscosity may be suitable for use in the liquid-hardenable resin. Selection of an appropriate solvent is dependent on the resin composition chosen and is within the ability of one skilled in the art with the benefit of this disclosure.

Nonlimiting examples of solvents suitable for use in this disclosure include aqueous dissolvable solvents, glycol ether solvents, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, hexoxyethanol, dipropylene glycol methyl ether, dipropylene glycol dimethyl ether, diethylene glycol methyl ether, ethyleneglycol butyl ether, diethyleneglycol butyl ether, propylene carbonate, methanol, ethanol, isopropanol, butyl alcohol, butyl lactate, butyl acetate, furfuryl acetate, dimethyl formamide, D-limonene, tetrahydrofurfuryl methacrylate, tetrahydrofurfuryl acrylate, esters of oxalic, maleic and succinic acids, fatty acid methyl esters, isomers thereof, and the like, or combinations thereof.

In an embodiment, the solvent comprises a compound characterized by Structure XVI:

Structure XVI

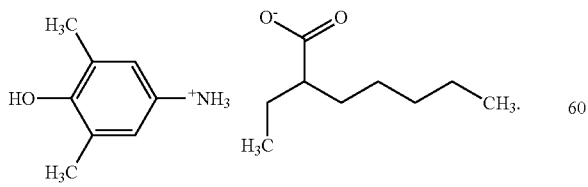

In an embodiment, the solvent may be included in the liquid-hardenable resin in any suitable amount. In an embodiment, a solvent of the type disclosed herein may be present in the liquid-hardenable resin in an amount of from about 0.1 wt. % to about 80 wt. %, alternatively from about 1 wt. % to about 50 wt. %, or alternatively from about 5 wt. % to about 30 wt. %, based on the weight of the liquid-hardenable resin.

In an embodiment, the liquid-hardenable resin may be included within the CRC in any suitable amount. In an embodiment, a liquid-hardenable resin of the type disclosed herein may be present within the CRC in an amount of from about 1 wt. % to about 90 wt. %, alternatively from about 10 wt. % to about 75 wt. %, or alternatively from about 20 wt. % to about 50 wt. %, based on the total weight of the CRC.

In an embodiment, the CRC comprises a hardening agent. As used herein, hardening agent refers to any substance capable of transforming the liquid-hardenable resin into a hardened, consolidated mass.

In an embodiment, the hardening agent comprises a hardener, a surfactant, an optional hydrolyzable ester and an optional liquid carrier fluid. In an embodiment, the hardening agent may be included within the CRC in any suitable amount. In an embodiment, a hardening agent of the type disclosed herein may be present within the CRC in an amount of from about 1 wt. % to about 90 wt. %, alternatively from about 10 wt. % to about 75 wt. %, or alternatively from about 20 wt. % to about 50 wt. %, based on the total weight of the CRC.

In an embodiment, the hardening agent comprises a hardener. Nonlimiting examples of hardeners suitable for use in this disclosure include aliphatic amines, aliphatic tertiary amines, aromatic amines, cycloaliphatic amines, heterocyclic amines, amido amines, polyamides, polyethyl amines, polyether amines, polyoxyalkylene amines, carboxylic anhydrides, triethylenetetraamine, ethylene diamine, N-cocoalkyltrimethylene, isophorone diamine, N-aminophenyl piperazine, imidazoline, 1,2-diaminocyclohexane, polytheramine, diethyltoluenediamine, 4,4'-diaminodiphenyl methane, methyltetrahydrophthalic anhydride, hexahydrophthalic anhydride, maleic anhydride, polyazelaic polyanhydride, phthalic anhydride, piperazine, aminoethylpiperazine, 2H-pyrrole, pyrrole, imidazole, pyrazole, pyridine, pyrazine, pyrimidine, pyridazine, indolizine, isoindole, 3H-indole, indole, 1H-indazole, purine, 4H-quinolizine, quinoline, isoquinoline, phthalazine, naphthyridine, quinoxaline, quinazoline, 4H-carbazole, carbazole, β-carboline, phenanthridine, acridine, phenathroline, phenazine, imidazolidine, phenoxazine, cinnoline, pyrrolidine, pyrroline, imidazoline, piperidine, indoline, isoindoline, quinuclindine, morpholine, azocine, azepine, 2H-azepine, 1,3,5-triazine, thiazole, pteridine, dihydroquinoline, hexamethylene imine, indazole, amines, bis-amines, tris-amines, aromatic amines, polyamines, aliphatic amines, cyclo-aliphatic amines, amides, polyamides, 2-ethyl-4-methyl imidazole, 1,1,3-trichlorotrifluoroacetoneor combinations thereof.

In an embodiment, the hardener comprises compounds characterized by any of Structures XVII through XIX:

Structure XVII

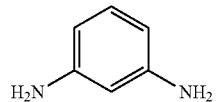

Structure XVIII

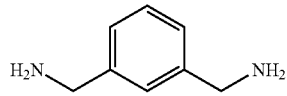

-continued

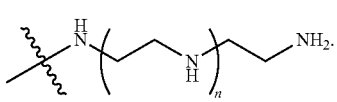

Structure XIX

Referring to Structure XIX, the wavy line designates a free valency which may be filled by a substituent and the atoms in parentheses represent repeating units of the formula where the repeating units may occur n times with the value of n ranging from about 1 to about 200, alternatively from about 1 to about 50, or alternatively from about 1 to about 20.

As will be understood by one of ordinary skill in the art, the hardener may be chosen to meet one or more user and/or process needs. For example, the hardener may be chosen so as to provide curing within some user and/or process desired temperature range. In an embodiment, the subterranean formation temperature may range of from about 60° F. to about 250° F. Under such conditions, the hardener may comprise amines, cyclo-aliphatic amines, piperidine, triethylamine, N,N-dimethylaminopyridine, benzyldimethylamine, tris(dimethylaminomethyl)phenol, 2-(N₂N-dimethylaminomethyl)phenol, or combinations thereof. In an embodiment, the subterranean formation temperature range is from about 60° F. to about 250° F. and the hardener comprises N,N-dimethylaminopyridine. In an embodiment, the subterranean formation temperature is greater than about 250° F. and the hardener comprises 4,4'-diaminodiphenyl sulfone. In an alternative embodiment, the subterranean formation temperature ranges from about 70° F. to about 350° F. and the hardener comprises piperazine, piperazine derivatives, aminoethyl piperazine, or combinations thereof.

In an embodiment, the hardener may be included in the hardening agent in any suitable amount. In an embodiment, a hardener of the type disclosed herein may be present in the hardening agent in an amount of from about 5 wt. % to about 95 wt. %, alternatively from about 15 wt. % to about 85 wt. %, or alternatively from about 25 wt. % to about 55 wt. %, based on the weight of the hardening agent.

In an embodiment, the hardening agent comprises a surfactant. Nonlimiting examples of surfactants suitable for use in this disclosure include an alkyl phosphonate surfactant, a C₁₂-C₂₂ alkyl phosphonate surfactant, an ethoxylated nonyl phenol phosphate ester, a cationic surfactant, a nonionic surfactant, or combinations thereof. Surfactants suitable for use in this disclosure are described in more detail in U.S. Pat. No. 6,311,773, which is incorporated by reference herein in its entirety.

In an embodiment, the surfactant may be included in the hardening agent in any suitable amount. In an embodiment, a surfactant of the type disclosed herein may be present in the hardening agent in an amount of from about 0.01 wt. % to about 10 wt. %, alternatively from about 0.1 wt. % to about 5 wt. %, or alternatively from about 1 wt. % to about 3 wt. %, based on the weight of the hardening agent.

In an embodiment, the hardening agent comprises a hydrolyzable ester. Nonlimiting examples of hydrolyzable esters suitable for use in this disclosure include dimethylglutarate, dimethyladipate, dimethylsuccinate, dimethylthiolate, methylsalicylate, dimethyl salicylate, dimethylsuccinate, t-butylhydroperoxide, or combinations thereof.

In an embodiment, the hydrolyzable ester may be included in the hardening agent in any suitable amount. In an embodiment, a hydrolyzable ester of the type disclosed herein may be present in the hardening agent in an amount of from about 0.01 wt. % to about 3 wt. %, alternatively from about 0.1 wt. % to about 2.5 wt. %, or alternatively from about 0.5 wt. % to about 2 wt. %, based on the weight of the hardening agent.

The hardening agent may comprise an optional carrier fluid. Any carrier fluid that is compatible with the hardening agent and achieves the desired viscosity effects may be suitable for use in the present disclosure. Some suitable liquid carrier fluids are those having high flash points (e.g., above about 125° F.). Nonlimiting examples of such carrier fluids include polyethylene glycol, butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, D-limonene, fatty acid methyl esters, and combinations thereof. As will be understood by one of ordinary skill in the art, selection of an appropriate liquid carrier fluid may be dependent on, inter alia, the resin composition chosen.

In an embodiment, the CRC comprises a hardenable resin, a hardening agent and a coupling agent. In an embodiment, the hardenable resin comprises the compound characterized by Structure XV, the hardening agent comprises the compounds characterized by Structure XVII or Structure XIX, and the coupling agent comprises the compound characterized by Structure V. In such embodiment, the hardenable resin and the hardeners may react to yield a compound characterized by Structure XX:

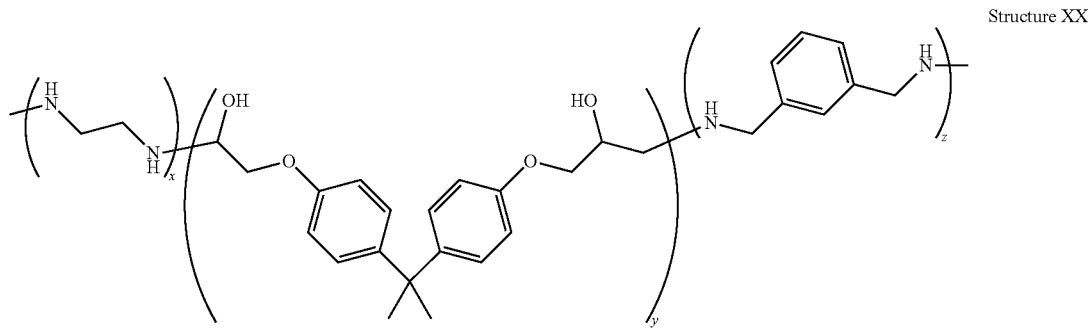

Structure XX wherein the atoms in parentheses represent repeating units of the formula where the repeating units may occur x times with the value of x ranging from about 1 to about 200, alternatively from about 1 to about 50, or alternatively from about 1 to about 20; y times with the value of y ranging from about 1 to about 200, alternatively from about 1 to about 50, or alternatively from about 1 to about 20; z times with the value of z ranging from about 1 to about 200, alternatively from about 1 to about 50, or alternatively from about 1 to about 20. The compound characterized by Structure XX may be further coupled to the coupling agent characterized by Structure V.

In an embodiment, the CRC comprises a hardenable resin, a hardening agent and a coupling agent. In an embodiment, the resin comprises a phenol/phenol formaldehyde/furfuryl alcohol resin, the hardening agent comprises the compound characterized by Structure XIX, wherein n=1, and the coupling agent comprises the compound characterized by Structure IV (i.e., L-3,4-dihydroxyphenylalanine, L-DOPA). In such embodiment, the phenol/phenol formaldehyde/furfuryl alcohol resin comprises from about 5 wt. % to about 30 wt. % phenol, from about 40 wt. % to about 70 wt. % phenol formaldehyde, and from about 10 wt. % to about 40 wt. % furfuryl alcohol, based on the total weight of the phenol/phenol formaldehyde/furfuryl alcohol resin. The hardening agent and the coupling agent may be coupled to each other resulting in a reaction product characterized by Structure XXI:

Structure XXI

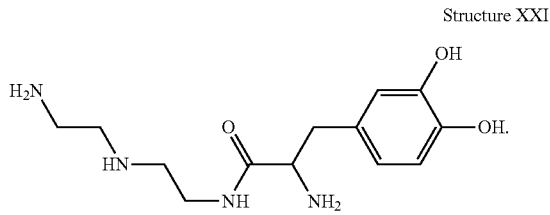 [SMILES: NCCNCCNC(=O)C(N)Cc1ccc(O)c(O)c1]

The compound characterized by Structure XXI may be further coupled to the phenol/phenol formaldehyde/furfuryl alcohol resin.

In an embodiment, the CRC comprises a resin, a hardening agent and a coupling agent. In an embodiment, the resin comprises a polyepoxide resin, the hardening agent comprises the compound characterized by Structure XIX, wherein n=1, and the coupling agent comprises gallic acid. In such an embodiment, the hardening agent and the coupling agent may be coupled to each other resulting in a compound characterized by Structure XXII:

Structure XXII

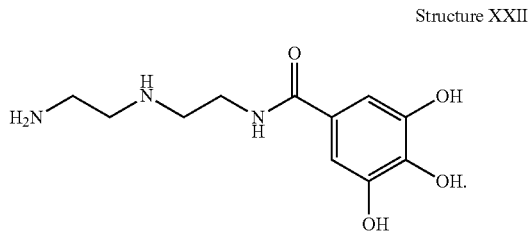 [SMILES: NCCNCCNC(=O)c1cc(O)c(O)c(O)c1]

The compound characterized by Structure XXII may be further coupled to the polyepoxide resin.

In an embodiment, the CRC may be prepared via any suitable method or process. The components of the CRC (e.g., hardenable resin, hardening agent, coupling agent) may be combined using any mixing device (e.g., blender, mixer) compatible with the composition. Each of the components of the CRC (e.g., hardenable resin, hardening agent, coupling agent) may be provided in any suitable form, e.g., emulsion form, aqueous form, oil form, etc. In an embodiment, the liquid hardenable resin, hardening agent, coupling agent and/or any optional materials may be either batch-mixed or mixed on-the-fly. The term "on-the-fly" is used herein to mean that a flowing stream is continuously introduced into another flowing stream so that the streams are combined and mixed while continuing to flow as a single stream as part of the on-going treatment. Such mixing may also be described as "real-time" mixing. On-the-fly mixing, as opposed to batch or partial batch mixing, may reduce waste and simplify subterranean treatments. In some embodiments, the CRC may be prepared in advance of its introduction to the wellbore. The CRC may be used alone or in combination with a substrate or particulate material (e.g., sand to yield a resin-coated sand) and further incorporated into a wellbore servicing fluid (e.g., fracturing fluid) and used in a wellbore servicing operation as described herein.

In an embodiment, a method of servicing a wellbore comprises drilling a wellbore in a subterranean formation and introducing to the formation a wellbore servicing fluid (WSF) comprising one or more CRCs as decribed herein. As used herein, a "servicing fluid" refers to a fluid used to drill, complete, work over, perforate, fracture, gravel pack, repair, or in any way prepare a wellbore for the recovery of materials residing in a subterranean formation penetrated by the wellbore. The servicing fluid is for use in a wellbore that penetrates a subterranean formation. It is to be understood that "subterranean formation" encompasses both areas below exposed earth and areas below earth covered by water such as ocean or fresh water.

Examples of WSF that may be used with one or more CRCs of the type described herein include, but are not limited to, completion fluids, fracturing fluids, gravel packing fluid, lost circulation fluids, spacer fluids, drilling fluids or muds. In an embodiment, the WSF comprises aqueous gels, viscoelastic surfactant gels, foamed gels and emulsions. Suitable aqueous gels are generally comprised of water and a gelling agent. Suitable emulsions can be comprised of two immiscible liquids such as an aqueous liquid or gelled liquid and a hydrocarbon.

The wellbore servicing fluid (WSF) may contain any amount of the CRC effective for the intended wellbore service. In an embodiment, the CRC is present in a WSF in an amount of from about 0.01 wt. % to about 50 wt. %, alternatively from about 1 wt. % to about 25 wt. %, or alternatively from about 2 wt. % to about 10 wt. %, based on the weight of the WSF.

In an embodiment, the WSF comprises one or more CRCs and an aqueous-based fluid. Herein, an aqueous-based fluid refers to a fluid having equal to or less than about 20 vol. %, 15 vol. %, 10 vol. %, 5 vol. %, 2 vol. %, or 1 vol. % of a non-aqueous fluid based on the total volume of the WSF. Aqueous-based fluids that may be used in the WSF include any aqueous fluid suitable for use in subterranean applications. For example, the WSF may comprise water or a brine. In an embodiment, the aqueous-based fluid comprises an aqueous brine. In such an embodiment, the aqueous brine generally comprises water and an inorganic monovalent salt, an inorganic multivalent salt, or both. The aqueous brine may be naturally occurring or artificially-created. Water present in the brine may be from any suitable source, examples of which include, but are not limited to, sea water, tap water, freshwater, water that is potable or non-potable, untreated water, partially treated water, treated water, produced water, city water, well-water, surface water, or combinations thereof. The salt or salts in the water may be present in any suitable amount. In an embodiment, the salt or salts in the water may be present within the aqueous-based fluid in an amount sufficient to yield a saturated brine.

Nonlimiting examples of aqueous brines suitable for use in the present disclosure include chloride-based, bromide-based, phosphate-based or formate-based brines containing monovalent and/or polyvalent cations, salts of alkali and alkaline earth metals, or combinations thereof. Additional examples of suitable brines include, but are not limited to: NaCl, KCl, NaBr, CaCl$_2$, CaBr$_2$, ZnBr$_2$, ammonium chloride (NH$_4$Cl), potassium phosphate, sodium formate, potassium formate, cesium formate, ethyl formate, methyl formate, methyl chloro formate, triethyl orthoformate, trimethyl orthoformate, or combinations thereof. The choice of brine may be dictated by a variety of factors such as the formation condition and the desired density of the resulting solution.

The WSF (in combination with one or more CRCs) may comprise additional additives as deemed appropriate for improving the properties of the fluid. Such additives may vary depending on the intended use of the fluid in the wellbore. Examples of such additives include, but are not limited to, emulsifiers, lime, organic/inorganic viscosifiers, weighting agents, glass fibers, carbon fibers, suspending agents, gelling agents, crosslinking agents, conditioning agents, dispersants, water softeners, oxidation and corrosion inhibitors, thinners, acid gas scavengers and combinations thereof. These additives may be introduced singularly or in combination using any suitable methodology and in amounts effective to produce the desired improvements in fluid properties.

In some embodiments, the CRC may be used alone as a fracture propping material or may be optionally combined with one or more particulate materials (i.e., proppants such as sand). For example, a formation may be treated in a variety of sequences including: (i) a WSF comprising CRC pumped into the formation followed by a WSF comprising proppant (e.g., sand); (ii) a WSF comprising proppant pumped into the formation followed by a WSF comprising CRC; (iii) proppant and CRC pumped concurrently into the formation; or (iv) combinations thereof. In various embodiments, the proppant (e.g., sand) may be pre-contacted and/or pre-coated with one or more components of the CRC prior to being placed into the wellbore, for example to form a resin coated sand. As will be apparent based upon a particular sequence, the CRC may bond sequentially and/or simultaneously with an appropriate substrate such as a proppant surface and/or a formation surface (e.g., fracture or wellbore surface).

In an embodiment, the WSF comprises a base fluid (e.g., an aqueous based fluid), CRC and optionally a proppant. As used herein, a proppant refers to a particulate material that is suitable for use in a proppant pack or a gravel pack. When deposited in a fracture, the proppant may form a proppant pack, resulting in conductive channels through which fluids may flow to the wellbore. The proppant functions to prevent the fractures from closing due to overburden pressures.

In an embodiment, the proppant comprises a naturally-occurring material. Alternatively, the proppant comprises a synthetic material. Alternatively, the proppant comprises a mixture of a naturally-occurring and a synthetic material. In an embodiment, the proppant may comprise any suitable particulate material, which may be used to prop fractures open, i.e., a propping agent or a proppant.

Nonlimiting examples of proppants suitable for use in this disclosure include silica (sand), graded sand, Ottawa sands, Brady sands, Colorado sands; resin-coated sands; gravels; synthetic organic particles, nylon pellets, high density plastics, teflons, rubbers, resins; ceramics, aluminosilicates; glass; sintered bauxite; quartz; aluminum pellets; ground or crushed shells of nuts, walnuts, pecans, almonds, ivory nuts, brazil nuts, and the like; ground or crushed seed shells (including fruit pits) of seeds of fruits, plums, peaches, cherries, apricots, and the like; ground or crushed seed shells of other plants (e.g., maize, corn cobs or corn kernels); crushed fruit pits or processed wood materials, materials derived from woods, oak, hickory, walnut, poplar, mahogany, and the like, including such woods that have been processed by grinding, chipping, or other form of particleization; or combinations thereof. In an embodiment, the proppant comprises sand.

The proppants may be of any suitable size and/or shape. Proppant particle size may be chosen by considering a variety of factors such as the particle size and distribution of the formation sand to be screened out by the proppant. In an embodiment, a proppant suitable for use in the present disclosure may have an average particle size in the range of from about 2 to about 400 mesh, alternatively from about 8 to about 100 mesh, or alternatively about 10 to about 70 mesh, U.S. Sieve Series.

In an embodiment, a proppant may be present in the WSF in an amount of from about 0.1 pounds per gallon (ppg) to about 28 ppg, alternatively from about 0.25 ppg to about 15 ppg, or alternatively from about 1 ppg to about 8 ppg, based on the volume of the WSF.

In an embodiment, the CRC and the proppant are introduced into the wellbore in the same stream. Alternatively, compositions comprising a WSF, proppant, coupling agent, hardening agent, hardenable resin and optional additives may be prepared using any suitable methodology. For example, the components (e.g., WSF, proppant, coupling agent, hardenable resin, hardening agent) may be mixed in a blender. Alternatively, the proppant may be coated with one or more of components of the CRC off-site (e.g., hardenable resin) and the resin-coated proppant may be transported to the well site where it is contacted with the other components of the CRC (e.g., WSF, coupling agent, hardening agent). In an alternative embodiment, components of the CRC are apportioned between separate flowpaths into the wellbore (e.g., split between an annular flowpath and a tubular flowpath formed by concentric wellbore tubulars) such that reaction between the components of the CRC is delayed until such components come into contact and mix within the wellbore proximate to a zone or interval to be treated (e.g., fractured).

In an alternative embodiment, the WSF comprises a CRC and is introduced into the wellbore prior to, subsequent to, and/or simultaneous with the proppant being placed into the wellbore. In yet another embodiment, the WSF comprising a CRC may be used to treat formation sand with the purpose of maintaining or supporting formation integrity, minimizing the formation of fines, and/or sand control in the formation.

In an embodiment, the WSF comprising a CRC and optionally a proppant further comprises an activator. An activator is a compound that facilitates the coupling of the CRC and the proppant particles and/or formation surface. In an embodiment, the activator comprises an oxidizer. In an embodiment, the activator promotes the oxidation of a coupling agent which may further enable the coupling of the CRC onto the proppant particles and/or onto the formation.

Nonlimiting examples of oxidizers suitable for use in this disclosure include organic hydroperoxides, t-butylhydroperoxide, sodium chlorite, sodium bromite, sodium, iodite, sodium persulfate, sodium perborate, oxygen, hydrogen peroxide, peroxy acids, and the like, or combinations thereof.

In an embodiment, the coupling of the CRC onto the proppant particles and/or onto one or surfaces of the formation, in the presence and/or absence of the activator, may be influenced by the ambient downhole environment to which the CRC is subjected (e.g., temperature, presence of moisture, oxygen, microorganisms, enzymes, pH, pressure, and the like, or combinations thereof).

In an embodiment, the activator may be characterized as operable within a suitable temperature range. As will be appreciated by one of skill in the art viewing this disclosure, differing activators may exhibit varying temperature ranges of operability. As such, in an embodiment, an activator, or combination of activators, may be selected for inclusion in the WSF such that the activator(s) exhibit a user and/or process-desired operable temperature range (e.g., an ambient bottom hole temperature (BHT) for a given wellbore). In an embodiment, the activator may exhibit an operable temperature range of from about 65° F. to about 450° F., alternatively from about 100° F. to about 350° F., or alternatively from about 125° F. to about 250° F. In an embodiment, the activator may be chosen to provide facilitating the coupling of the CRC and the proppant particles and/or formation surface at lower BHTs, such as a temperature range of from about 65° F. to about 200° F.

In an embodiment, the contacting of the components of the CRC with the proppant and/or formation may initiate the coupling of the CRC onto the proppant particles and/or onto the formation, even in the absence of an activator. One of ordinary skill in the art with the benefits of this disclosure may select an activator to provide some user and/or process-desired couplingo f the CRC with the proppant and/or one or more surfaces of the formation.

In an embodiment, the WSF comprising a CRC and optionally a proppant may be used in a fracturing wellbore servicing operation. Hydraulic fracturing, which is commonly referred to as fracturing, is a process used to increase the flow of desirable fluids, such as oil and gas, from a portion of a subterranean formation. Hydraulic fracturing operations generally involve introducing a fracturing fluid into a subterranean formation at a pressure sufficient to create or enhance one or more fractures in the formation. Enhancing a fracture includes enlarging a pre-existing fracture in the formation.

In an embodiment, the compositions (i.e., CRC) and methods disclosed herein may be advantageously employed in the performance of one or more wellbore servicing operations. For example when utilizing a CRC in conjunction with an activator of the type previously described herein, the CRC can be positioned within the wellbore before any resin coupling to the proppant (where present) and/or to the formation occurs. In such embodiments, the resin may be pumped deeper into the formation, when compared to conventional resin systems for coating proppants.

In an embodiment, the CRC may be used for penetration into the near-wellbore region, alternatively the CRC may penetrate the fracture into the far-wellbore region. For example, the CRC may be advantageously used for far-field penetration in shale formations, for example alone or in combination with proppant such as sand. In an embodiment, the structure of the coupling agent component of the CRC may be tailored to advantageously delay the surface adherence such that the resin may be placed further into the formation, e.g., in a far-field region. For example, when the coupling agent comprises hydroxyl groups, one or more hydroxyl groups of the coupling agent may be protected with any suitable protective group (e.g., borates, esters, trimethylsilyl, triethylsilyl, dimethylisopropylsilyl, diethylisopropylsilyl, t-butyldimethylsilyl, t-butyldiphenylsilyl, triisopropylsilyl, etc.) to delay the surface adherence of the coupling agents. Without wishing to be limited by theory, a protective group is meant to temporarily inhibit the function (e.g., adhesion) of the functional group (e.g., hydroxyl) it is protecting; the function (e.g., adhesion) of the functional group (e.g., hydroxyl) may be restored by removing the protective group by using any suitable methodology. The near-wellbore region delimitation is dependent upon the formation where the wellbore is located, and is based on the wellbore surrounding conditions. The far-wellbore region is different from the near-wellbore region in that it is subjected to an entirely different set of conditions and/or stimuli. In an embodiment, the near-wellbore region comprises about the first 50 feet of the wellbore from the surface, whereas the far-wellbore region refers to a depth that is greater than about 50 feet of the depth of the wellbore. In an example, the CRC described in the present disclosure may be used for penetration distances of about 1000 feet, alternatively about 500 feet, alternatively about 300 feet, alternatively about 100 feet, alternatively about 50 feet, alternatively about 20 feet, alternatively about 20 in., alternatively about 2 in. In an embodiment, the CRC penetrates fractures or portions thereof that may be otherwise too small to allow penetration and placement of traditional proppants such as sand. For example, a CRC may penetrate a distance beyond a traditional proppant pack (e.g., in a far-field region of the formation) and serve to further prop-open small, micro-fractures that might otherwise go un-propped and/or close in the absence of the CRC. For example, fracturing fluids comprising a CRC may be used to treat fractures having depth of penetration ranging from a few inches to a full fracture length. For example, a single fracture wing may have a length of several hundreds of ft to more than a thousand ft.

In an embodiment, a CRC may advantageously display a high coupling strength to the proppant and/or to the formation. Without wishing to be limited by theory, the coupling strength of a compound to a given surface may be characterized by the force (e.g., rupture force) required to remove the coupled compound from the surface; the rupture force may be expressed in N (Newton) units. In an embodiment, the CRC may be characterized by a rupture force of from about 100 pN to about 1 μN, alternatively from about 1 nN to about 500 nN, or alternatively from about 1 nN to about 10 nN. Further, without wishing to be limited by theory, the coupling strength of a compound to a given surface may be characterized by the adhesion strength, which is the force required to remove the coupled compound from the surface, per unit of surface; the adhesion strength may be expressed in Pa (Pascal) units. In an embodiment, the CRC may be characterized by an adhesion strength of from about 0.1 MPa to about 20 MPa, alternatively from about 1 MPa to about 15 MPa, or alternatively from about 4 MPa to about 10 MPa.

In an embodiment, the coupling agent component of the CRC may be advantageously sourced from food grade chemicals. For example, the coupling agent may comprise gallates (e.g., ethyl gallate, octyl gallate) that are antioxidant food additives. The use of food grade additives provides advantages in that the additives are non-toxic and preferred for health, safety and environmental concerns over traditional Si-based coupling agents. In an embodiment, the coupling agent component of the CRC may be advantageously more biocompatible and degradable than the traditional materials used as coupling agents in wellbore servicing operations. Additional advantages of the WSF system and/or the methods of using the same may be apparent to one of skill in the art viewing this disclosure.

Additional Disclosure

The following enumerated embodiments are provided as non-limiting examples.

A first embodiment, which is a method of servicing a wellbore in a subterranean formation comprising placing a wellbore servicing fluid comprising a coupling agent, a hardenable resin and a hardening agent into the wellbore wherein the coupling agent comprises a multihydroxy phenyl, a dihydroxy phenyl, a trihydroxy phenyl, ascorbic acid, a hydroxymethylnaphthol, an oxidation product thereof, a derivative thereof, or combinations thereof.

A second embodiment, which is the method of the first embodiment wherein the coupling agent comprises a compound characterized by Structure I:

Structure I

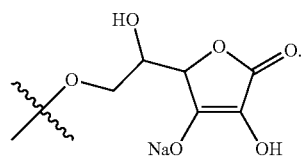

A third embodiment, which is the method of any of the first through second embodiments wherein the dihydroxyphenyl comprises caffeic acid, or a compound characterized by any of Structure II, Structure III, Structure IV or Structure V:

Structure II

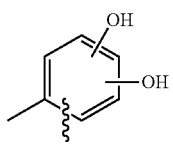

Structure III

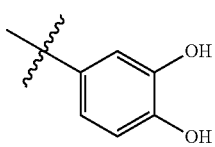

Structure IV

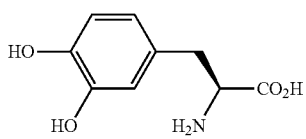

Structure V

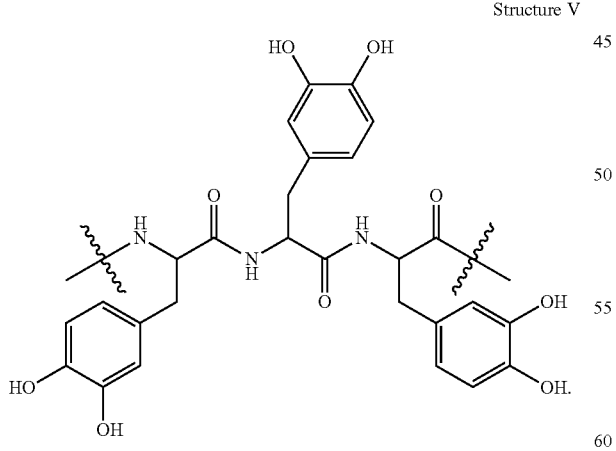

A fourth embodiment, which is the method of any of the first through third embodiments wherein the trihydroxyphenyl comprises gallic acid, a gallate, ethyl gallate, octyl gallate, or a compound characterized by any of Structure VI or Structure VII:

Structure VI

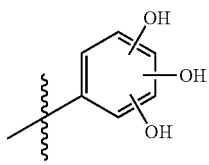

Structure VII

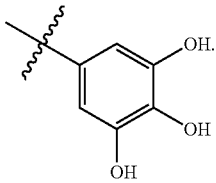

A fifth embodiment, which is the method of any of the first through fourth embodiments wherein the hydroxymethylnaphthol comprises a compound characterized by Structure VIII or Structure IX:

Structure VIII

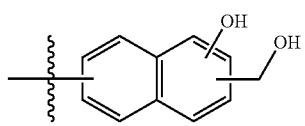

Structure IX

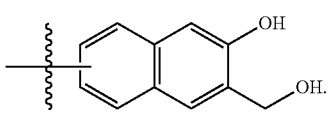

A sixth embodiment, which is the method of any of the first through fifth embodiments wherein the coupling agent comprises a compound characterized by any of Structures X through XIV:

Structure X

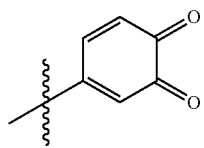

Structure XI

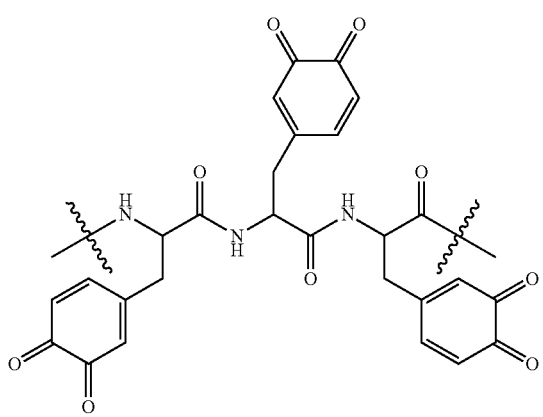

Structure XII

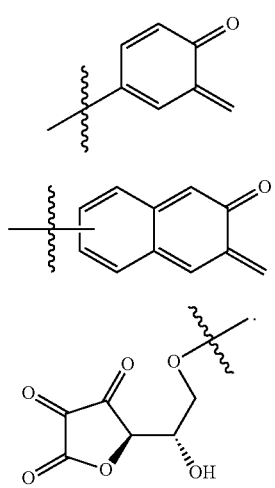

Structure XIII

Structure XIV

Structure XVI

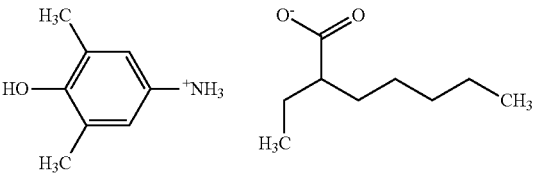

A seventh embodiment, which is the method of any of the first through sixth embodiments wherein the coupling agent is present in an amount of from about 0.01 wt. % to about 10 wt. %, based on the total weight of the wellbore servicing fluid.

An eighth embodiment, which is the method of any of the first through seventh embodiments wherein the hardenable resin comprises an organic resin, bisphenol A diglycidyl ether resin, butoxymethyl butyl glycidyl ether resin, bisphenol A-epichlorohydrin resin, bisphenol F resin, polyepoxide resin, bisphenol epoxy resin, novolak resin, polyester resin, aldehyde resin, phenolic resin, a terpolymer of phenol, phenol-aldehyde resin, phenolic formaldehyde resin, urea-aldehyde resin, furan resin, a furfuryl alcohol resin, urethane resin, glycidyl ether resin, a compound characterized by Structure XV:

Structure XV

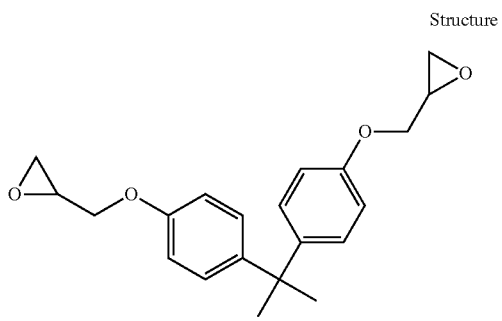

or combinations thereof

A ninth embodiment, which is the method of any of the first through eighth embodiments wherein the hardenable resin further comprises a solvent.

A tenth embodiment, which is the method of the ninth embodiment wherein the solvent comprises an aqueous dissolvable solvent, a glycol ether solvent, 2-butoxy ethanol, an ether of a $C_2$ to $C_6$ dihydric alkanol containing at least one $C_1$ to $C_6$ alkyl group, a mono ether of dihydric alkanol, methoxypropanol, butoxyethanol, hexoxyethanol, dipropylene glycol methyl ether, dipropylene glycol dimethyl ether, diethylene glycol methyl ether, ethyleneglycol butyl ether, diethyleneglycol butyl ether, propylene carbonate, methanol, ethanol, isopropanol, butyl alcohol, butyl lactate, butyl acetate, furfuryl acetate, dimethyl formamide, D-limonene, tetrahydrofurfuryl methacrylate, tetrahydrofurfuryl acrylate, an ester of oxalic, maleic or succinic acid, a fatty acid methyl ester, a compound characterized by Structure XVI:

or combinations thereof

An eleventh embodiment, which is the method of any of the first through tenth embodiments wherein the hardenable resin is present in an amount of from about 1 wt. % to about 90 wt. % based on the total weight of the wellbore servicing fluid.

A twelfth embodiment, which is the method of any of the first through eleventh embodiments wherein the hardening agent comprises a hardener, a surfactant, an optional hydrolysable ester, and an optional liquid carrier fluid.

A thirteenth embodiment, which is the method of the twelfth embodiment wherein the hardener comprises piperazine, aminoethylpiperazine, 2H-pyrrole, pyrrole, imidazole, pyrazole, pyridine, pyrazine, pyrimidine, pyridazine, indolizine, isoindole, 3H-indole, indole, 1H-indazole, purine, 4H-quinolizine, uinolone, isoquinoline, phthalazine, naphthyridine, quinoxaline, quinazoline, 4H-carbazole, carbazole, β-carboline, phenanthridine, acridine, phenathroline, phenazine, imidazolidine, phenoxazine, cinnoline, pyrrolidine, pyrroline, imidazoline, piperidine, indoline, isoindoline, quinuclindine, morpholine, azocine, azepine, 2H-azepine, 1,3,5-triazine, thiazole, pteridine, dihydroquinoline, hexamethylene imine, indazole, an amine, a bis-amine, a tris-amine, an aromatic amine, a polyamine, an aliphatic amine, a cyclo-aliphatic amine, an amide, a polyamide, 2-ethyl-4-methyl imidazole, 1,1,3-trichlorotrifluoroacetone, compounds characterized by Structure XVII, Structure XVIII or Structure XIX:

Structure XVII

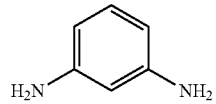

Structure XVIII

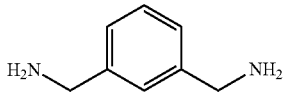

Structure XIX

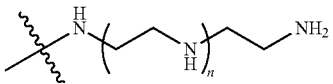

or combinations thereof

A fourteenth embodiment, which is the method of any of the twelfth through thirteenth embodiments wherein the surfactant comprises an alkyl phosphonate surfactant, a $C_{12}$-$C_{22}$ alkyl phosphonate surfactant, an ethoxylated nonyl phenol phosphate ester, a cationic surfactant, a nonionic surfactant, or combinations thereof.

A fifteenth embodiment, which is the method of any of the twelfth through fourteenth embodiments wherein the optional hydrolyzable ester comprises dimethylglutarate, dimethyladipate, dimethylsuccinate, dimethylthiolate, methylsalicylate, dimethyl salicylate, dimethylsuccinate, t-butylhydroperoxide, or combinations thereof.

A sixteenth embodiment, which is the method of any of the twelfth through fifteenth embodiments wherein the optional liquid carrier fluid comprises polyethylene glycol, butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, D-limonene, a fatty acid methyl ester, or combinations thereof.

A seventeenth embodiment, which is the method of any of the first through sixteenth embodiments wherein the hardening agent is present in the wellbore servicing fluid in an amount of from about 1 wt. % to about 90 wt. % based on the total weight of the WSF.

An eighteenth embodiment, which is the method of any of the first through seventeenth embodiments wherein the wellbore servicing fluid comprises a fracturing fluid further comprising a proppant and an activator.

A nineteenth embodiment, which is the method of the eighteenth embodiment wherein the activator comprises oxidizers, organic hydroperoxides, t-butylhydroperoxide, sodium chlorite, sodium bromite, sodium, iodite, sodium persulfate, sodium perborate, or combinations thereof.

A twentieth embodiment, which is a wellbore servicing fluid comprising a coupling agent, a hardenable resin, a hardening agent and a proppant wherein the coupling agent comprises a multihydroxy phenyl, a dihydroxy phenyl, a trihydroxy phenyl, ascorbic acid, a hydroxymethylphenol, a hydroxymethylnaphthol, an oxidation product thereof, a derivative thereof, or combinations thereof.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of servicing a wellbore in a subterranean formation comprising:

placing a wellbore servicing fluid comprising a coupling agent, a hardenable resin, and a hardening agent into the wellbore wherein the coupling agent comprises a compound selected from the group consisting of: an oxidized multi hydroxy phenyl, an oxidized dihydroxy phenyl, an oxidized trihydroxy phenyl, oxidized ascorbic acid, an oxidized hydroxymethylnaphthol, and any combination thereof;

wherein the hardenable resin comprises a resin selected from the group consisting of: a bisphenol A diglycidyl ether resin, a butoxymethyl butyl glycidyl ether resin, a bisphenol A-epichlorohydrin resin, a bisphenol F resin, a polyepoxide resin, a bisphenol epoxy resin, a novolac resin, a polyester resin, an aldehyde resin, a phenolic resin, a terpolymer of phenol, a phenol-aldehyde resin, a phenolic formaldehyde resin, an urea-aldehyde resin, a furan resin, a furfuryl alcohol resin, a urethane resin, a glycidyl ether resin, a compound characterized by Structure XV:

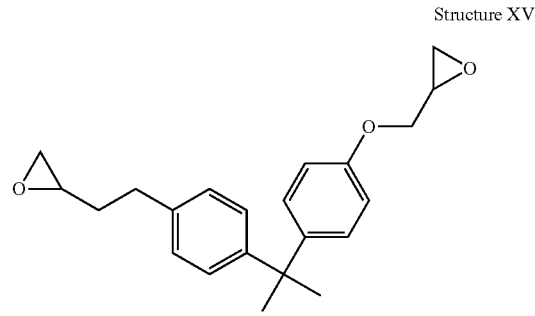 [SMILES: CC(C)(c1ccc(CCC2CO2)cc1)c1ccc(OCC2CO2)cc1]

Structure XV and any combination thereof; and forming a covalent bond between the coupling agent and one or more surfaces of the subterranean formation, the hardenable resin, the hardening agent, or any combination thereof wherein the covalent bond is formed by a cycloaddition reaction.

2. The method of claim 1, wherein the coupling agent comprises the oxidation product of a compound characterized by Structure I:

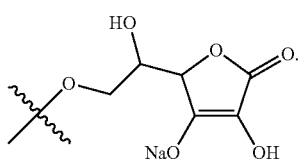

Structure I

3. The method of claim 1, wherein the oxidized dihydroxyphenyl comprises oxidized caffeic acid, or the oxidation product of a compound characterized by any of Structure II, Structure III, Structure IV or Structure V:

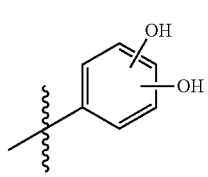

Structure II

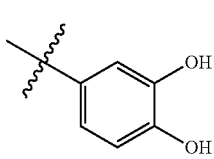

Structure III

Structure IV

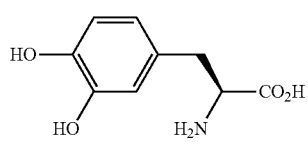

Structure V

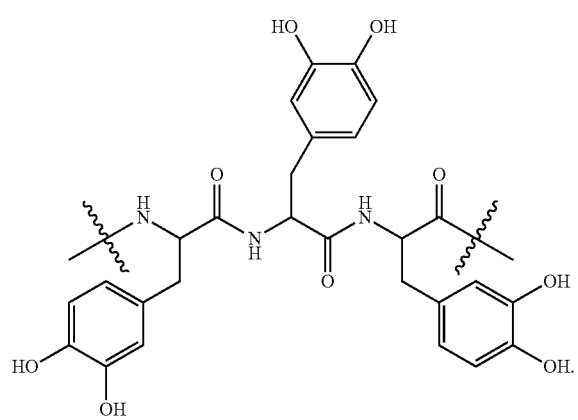

4. The method of claim 1, wherein the oxidized trihydroxyphenyl comprises a compound selected from the group consisting of: oxidized gallic acid, an oxidized gallate, oxidized ethyl gallate, oxidized octyl gallate, the oxidized product of a compound characterized by any of Structure VI, and the oxidized product of a compound characterized by any structure of Structure VII:

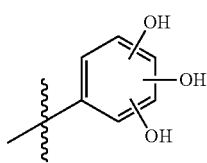

Structure VI

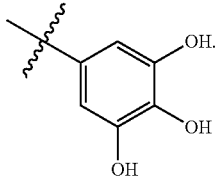

Structure VII

5. The method of claim 1, wherein the oxidized hydroxymethylnaphthol comprises the oxidized product of a compound characterized by Structure VIII or Structure IX:

Structure VIII

Structure IX

6. The method of claim 1, wherein the coupling agent is present in an amount of from about 0.01 wt. % to about 10 wt. %, based on the total weight of the wellbore servicing fluid.

7. The method of claim 1, wherein the hardenable resin further comprises a solvent.

8. The method of claim 7, wherein the solvent is selected from the group consisting of: an aqueous dissolvable solvent, a glycol ether solvent, 2-butoxy ethanol, an ether of a $C_2$ to $C_6$ dihydric alkanol containing at least one $C_1$ to $C_6$ alkyl group, a mono ether of dihydric alkanol, methoxypropanol, butoxyethanol, hexoxyethanol, dipropylene glycol methyl ether, dipropylene glycol dimethyl ether, diethylene glycol methyl ether, ethyleneglycol butyl ether, diethyleneglycol butyl ether, propylene carbonate, methanol, ethanol, isopropanol, butyl alcohol, butyl lactate, butyl acetate, furfuryl acetate, dimethyl formamide, D-limonene, tetrahydrofurfuryl methacrylate, tetrahydrofurfuryl acrylate, an ester of oxalic, maleic or succinic acid, a fatty acid methyl ester, a compound characterized by Structure XVI:

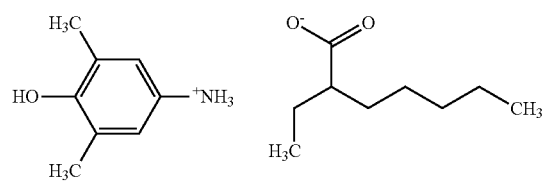

Structure XVI and any combination thereof.

9. The method of claim 1, wherein the hardenable resin is present in an amount of from about 1 wt. % to about 90 wt. % based on the total weight of the wellbore servicing fluid.

10. The method of claim 1, wherein the hardening agent comprises a hardener, a surfactant, an optional hydrolysable ester, and an optional liquid carrier fluid.

11. The method of claim 10, wherein the hardener is selected from the group consisting of: piperazine, aminoethylpiperazine, 2H-pyrrole, pyrrole, imidazole, pyrazole, pyridine, pyrazine, pyrimidine, pyridazine, indolizine, isoindole, 3H-indole, indole, 1H-indazole, purine, 4H-quinolizine, quinoline, isoquinoline, phthalazine, naphthyridine, quinoxaline, quinazoline, 4H-carbazole, carbazole, β-carboline, phenanthridine, acridine, phenathroline, phenazine, imidazolidine, phenoxazine, cinnoline, pyrrolidine, pyrroline, imidazoline, piperidine, indoline, isoindoline, quinuclindine, morpholine, azocine, azepine, 2H-azepine, 1,3,5-triazine, thiazole, pteridine, dihydroquinoline, hexamethylene imine, indazole, an amine, a bis-amine, a tris-amine, an aromatic amine, a polyamine, an aliphatic amine, a cyclo-aliphatic amine, an amide, a polyamide, 2-ethyl-4-methyl imidazole, 1,1,3-trichlorotrifluoroacetone, a compound characterized by Structure XVII, a compound characterized by Structure XVIII, a compound characterized by Structure XIX:

Structure XVII

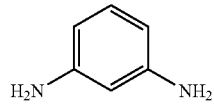

Structure XVIII

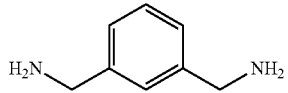

Structure XIX

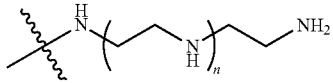

and any combination thereof.

12. The method of claim 10, wherein the surfactant comprises a surfactant selected from the group consisting of: an alkyl phosphonate surfactant, a $C_{12}$-$C_{22}$ alkyl phosphonate surfactant, an ethoxylated nonyl phenol phosphate ester, a cationic surfactant, a nonionic surfactant, and any combination thereof.

13. The method of claim 10, wherein the optional hydrolyzable ester comprises a compound selected from the group consisting of: dimethylglutarate, dimethyladipate, dimethylsuccinate, dimethylthiolate, methylsalicylate, dimethyl salicylate, dimethylsuccinate, t-butylhydroperoxide, and any combination thereof.

14. The method of claim 10, wherein the optional liquid carrier fluid comprises a fluid selected from the group consisting of: polyethylene glycol, butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, D-limonene, a fatty acid methyl ester, and any combination thereof.

15. The method of claim 1, wherein the hardening agent is present in the wellbore servicing fluid in an amount of from about 1 wt. % to about 90 wt. % based on the total weight of the wellbore servicing fluid.

16. The method of claim 1, wherein the wellbore servicing fluid comprises a fracturing fluid further comprising a proppant and an activator.

17. The method of claim 16, wherein the activator comprises oxidizers, organic hydroperoxides, t-butylhydroperoxide, sodium chlorite, sodium bromite, sodium, iodite, sodium persulfate, sodium perborate, and any combination thereof.

* * * * *